United States Patent [19]
Walworth

[11] 3,930,011
[45] Dec. 30, 1975

[54] PYRAZOLIUM FUNGICIDES

[75] Inventor: Bryant Leonidas Walworth, Pennington, N.J.

[73] Assignee: American Cyanamid Company, Stamford, Conn.

[22] Filed: Feb. 3, 1975

[21] Appl. No.: 546,654

[52] U.S. Cl. .............................................. 424/273
[51] Int. Cl.² .......................................... A01N 9/22
[58] Field of Search ..................................... 426/273

[56] References Cited
OTHER PUBLICATIONS
Chemical Abstracts, 79:92,210a, (1973).

*Primary Examiner*—Leonard Schenkman
*Attorney, Agent, or Firm*—Harry H. Kline

[57] ABSTRACT

There is provided a method for protecting living plants from attack by fungal organisms by applying to the foliage of said plants a fungicidally effective amount of a 1,2-substituted-3,5-diphenylpyrazolium salt.

14 Claims, No Drawings

PYRAZOLIUM FUNGICIDES

The present invention relates to a method for protecting crops, such as cereal grains, ornamentals, shrubs and fruit trees and vines from attack by fungal organisms by applying to the foliage of said plants, a fungicidally effective amount of a compound having the formula:

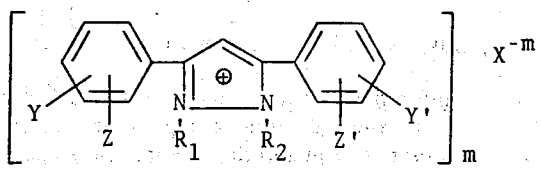

wherein $R_1$ is methyl; $R_2$ is $C_1$-$C_3$ alkyl, allyl, propynyl, ethylcarboxymethyl, phenyl or benzyl; Y, Y', Z and Z' each represent members selected from the group consisting of hydrogen, halogen, $C_1$-$C_4$ alkyl and $C_1$-$C_4$ alkoxy; X represents an anion having a charge of 1 or 2; and m is an integer selected from 1 and 2.

The compounds hereinabove defined have been found to be effective fungicidal agents are described in Netherland's application No. 7,217,015, published on June 19, 1973. There is described therein a relatively broad class of 1,2-dialkyl-3,5-diphenylpyrazolium salts as well as a method for their preparation. There is also described the use of such pyrazolium salts as effective herbicidal agents, particularly useful for the selective control of wild oats in the presence of wheat, barley, or other cereal crops.

There is no suggestion or teaching of the use of the said pyrazolium salts as fungicidal agents; nor is it obvious from the Netherland disclosure that selected 1,2-dialkyl-3,5-diphenylpyrazolium salts would be effective for protecting crops, shrubs, ornamentals, fruit and nut trees, and vines, from attack by fungal organisms.

In the formula above, any lower alkyl substituent, for example, methyl, ethyl, n-propyl, iso-propyl, n-butyl and tert-butyl can be employed. However, methyl is preferred. Further, the halogen substituents include chloro, fluoro, bromo and iodo. The chloro, iodo and fluoro substituents are, however, preferred.

In general, there is employed an alkoxy substituent which includes methoxy, ethoxy, n-propoxy, iso-propoxy, n-butoxy, iso-butoxy and tert-butoxy. However, methoxy and butoxy are preferred.

Among the anions which are suitable for use in the compounds utilized in present invention are halides, such as chloride, bromide and iodide, methyl sulfate, perchlorate, p-toluene sulfonate, hydroxide, phosphate, benzene sulfonate, hydrogen sulfate, $C_1$-$C_4$ alkane sulfonate, $C_1$-$C_3$ alkyl benzene sulfonate, $C_1$-$C_4$ alkoxy benzene sulfonate, hydrogen carbonate, sulfate, $Br_3^-$, $I_3^-$, and nitrate.

In practice, an embodiment of this invention relates to the use of a preferred group of compounds of this invention as fungicidal and/or plant protection agents, particularly those compounds having the above formula, wherein $R_1$ is methyl; $R_2$ is $C_1$-$C_3$ alkyl, allyl, propynyl, ethylcarboxymethyl, phenyl or benzyl; Y, Y', Z and Z' are each hydrogen; m is 1 or 2; and X is an anion with a charge of 1 or 2, and preferably selected from those specifically identified above.

Another preferred embodiment of this invention relates to a method for controlling fungi and/or protecting cereal crops, ornamentals, shrubs, fruit and nut trees and fruit-bearing vines, from attack by fungi, by applying to the foliage of said plants a fungicidally effective amount of a compound having the above formula, wherein $R_1$ and $R_2$ are each methyl; Y, Y', Z and Z' each represent members selected from the group consisting of hydrogen, chloro, fluoro, iodo, methyl, methoxy and butoxy; m is 1 or 2; and X is an anion with a charge of 1 or 2, and preferably selected from those specifically mentioned above.

A still further preferred embodiment of this invention involves the method referred to immediately above, excepting that two of the members represented by Y, Y', Z and Z' in the compound formula are hydrogen and two of said members are selected from chloro, fluoro, methyl, methoxy and butoxy.

In general, it has been found that the compounds of the present invention are effective fungicidal agents useful for the control of fungi which infect living plants. They are particularly effective for controlling powdery mildew, especially on grains, such as barley, corn, sorghum and wheat, on vines such as cucumbers, grapes and pumpkins, and on fruit and nut trees, such as apples, pears and pecans. However, they are also effective for controlling fungi which are the causative agents for rice blast, late blight and apple scab.

In utilizing the above-identified pyrazolium salts for protecting living plants from pathogenic fungi, it has been found it most advantageous to apply the active material to the foliage of the plants in the form of a liquid, preferably aqueous, spray. Solutions or suspensions containing from about 50 ppm to 5,600 ppm, and preferably 50 ppm to 500 ppm of the pyrazolium cation are generally highly effective for this use. As the pyrazolium salts of this invention exhibit substantial water solubility, the active salts can simply be dissolved in water and applied as such, or a surfactant or mixture of surfactants can be added to the aqueous mixture.

The pyrazolium salts may also be prepared as wettable powders or as water-miscible concentrates which are diluted with water or other suitable polar solvents, generally at the site of use, and then applied as a dilute aqueous spray. Generally, such sprays are applied at the volume rate of about 938 liters to 1,877 liters per hectare, or about 100 gallons to 200 gallons per acre. It is, of course, obvious that smaller or larger volumes of liquid spray may be employed, e.g. 400 liters to 4,000 liters per hectare may be used depending on a variety of factors, including the type of crop, the plant spacing, and the amount of foliage per plant being treated.

While fungicide treatments are generally discussed in terms of concentration of active ingredient in ppm in the solution or suspension, it should also be noted that, with the compounds of the present invention, it is generally desirable to apply the pyrazolium salt in an amount sufficient to provide about 0.5 kg/ha to 10.0 kg/ha, and preferably 0.5 kg/ha to 4 kg/ha, of the pyrazolium cation.

Wettable powder formulations can be prepared by grinding together about 25 percent to 95 percent by weight of the pyrazolium salt, and about 75 percent to 5 percent by weight of a solid diluent such as attapulgite, kaolin, bentonite, diatomaceous earth, silica, talc, fullers earth, or the like. To this mixture is added about 1 percent to 5 percent by weight of a dispersing agent such as the calcium salt of a polymerized alkyl aryl sulfonic acid, sodium lignosulfonate, or sodium salt of condensed naphthalene sulfonic acid, and about 1 percent to 5 percent by weight of a surfactant, such as polyoxyethylated vegetable oil, alkyl phenoxy polyoxyethylene ethanol, sodium alkyl naphthalene sulfonate is also blended with the formulation.

The water-miscible concentrates are prepared by dissolving from 15 percent to 70 percent by weight of the compound in 85 percent to 30 percent by weight of a water-miscible solvent, such as water itself or another polar water-miscible solvent, such as 2-methoxy ethanol, methanol, propylene glycol, diethylene glycol, diethylene glycol monoethyl ether, formamide, and methylformamide. Application of the material is made by adding a predetermined quantity of the water-miscible concentrate to a spray tank and applying as such, or in combination with, additional suitable diluent, such as a further quantity of water or one of the polar solvents mentioned above.

The performance of the product in the above formulations, which are applied as liquid sprays, is improved by adding a surfactant, or blend of surfactants, thereto. Conventional nonionic surfactants are preferred, and the surfactants are preferably added to the spray tank at the rate of 0.1 percent to 5 percent by volume to provide good wetting of the spray solution on plant foliage.

Suitable nonionic surfactants include alkyl polyoxyethylene ethers, polyoxyethylene (20) sorbitan monolaurate, polyoxyethylene (20) sorbitan monooleate, alkyl aryl polyglycol ethers, alkyl phenol ethoxylates, trimethyl nonyl polyethylene glycol ethers, alkyl phenol ethylene oxide condensates, octyl phenoxy polyethoxy ethanols, nonylphenyl polyethylene glycol ethers, condensates of polyoxyethylenes, polyoxypropylenes, aliphatic polyethers, aliphatic polyesters, alkyl aryl polyoxyethylene glycols, and the like. Especially preferred are nonionic surfactants having a hydrophilic-lipophilic balance (HLB) of from 11 to 16. This conventional surfactant classification test is described, for example, on page 232 et seq of Emulsion Theory and Practice by Paul Becher, Rheinholt Publishing Corporation, second edition (1965); also available as No. 162 in the American Chemical Society's Monograph Series.

Briefly, the pyrazolium salts of this invention are conveniently prepared by first condensing the appropriate diketone with hydrazine or a $C_1$-$C_4$ lower alkyl hydrazine to form the corresponding 3,5-diphenylpyrazole. Thereafter, said pyrazole is alkylated to form the desired pyrazolium salt.

Where hydrazine is employed in the condensation, alkylations are effected at the 1 and 2 positions. Where a lower alkyl hydrazine is employed in the initial condensation, alkylation is effected at the 2 position. These reactions are graphically depicted as follows:

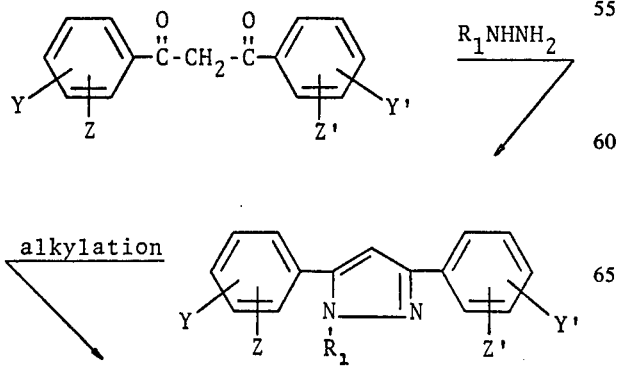

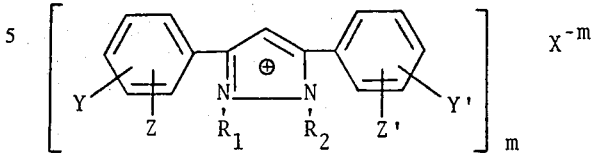

where $R_1$, $R_2$, X, Y, X', Y' and m are each as defined above.

The ring-forming reaction between hydrazine or alkyl hydrazine and the diketone is preferably carried out in the presence of an aprotic solvent such as xylene, toluene or benzene, or in a protic solvent such as a $C_1$-$C_4$ alcohol at a temperature between 80°C and 100°C.

Alkylation of the thus-formed 3,5-diphenylpyrazole is then carried out with an alkylating agent such as an alkyl halide, alkyl sulfate, or alkyl toluene sulfonate, preferably in the presence of an acid acceptor such as an alkali metal hydroxide, tertiary organic amine or alkali metal alkoxide.

This invention is further illustrated by the examples set forth below, which are provided simply by way of illustration.

EXAMPLE 1

To determine the effectiveness of pyrazolium salts as fungicidal agents, a variety of pathogenic fungi, host plants and pyrazolium salts are used in the following tests. Pathogens, host plants, the method of testing, and the rating system used are reported below, along with the data obtained.

PATHOGENS

*Phytophthora infestans* (Mont.) Dby, the late blight fungus of tomato and potato.
*Piricularia oryzae* Cavara, the rice blast pathogen.
*Venturia inaequalis* (Cke.) Wint. which causes apple scab.
*Erysiphe cichoracearum* DC, the cause of powdery mildew on cucurbits.
*Podosphaera leucotricha* (E. & E.) Salm., the cause of powdery mildew of apples and pears.
*Erysiphe graminis* f.sp. tritici, the cause of powdery mildew on wheat.
*Erysiphe graminis* f.sp. hordei, the cause of powdery mildew on barley.

HOST PLANTS

Rice (*Oryza sativa*) (Cv. Nato)
Tomato (*Lycopersicum esculentum*) (Cv. Bonny Best)
Cucumber (*Cucumis sativus*) (Cv. Marketer)
Apple (*Malus sylvestris*) (seedling)
Wheat (*Triticum aestivum*) (Cv. Bonanza)
Barley (*Hordeum vulgare*) (Cv. Larker)

Plants are individually grown in 5.08 cm peat squares and assembled in 7.62 cm × 25.4 cm pressed fibre containers the week prior to spraying. With the exception of rice and wheat, a single specimen of each species is used. A separate container is used for those plants in the mildew evaluation. The complete test system is shown below:

| Series No. 1 | Series No. 2 |
|---|---|
| Rice: rice blast | Apple: powdery mildew |
| Tomato: late blight | Cucumber: powdery mildew |
| Apple: apple scab | Wheat: powdery mildew |
| | Barley: powdery mildew |

Spray solutions are prepared at a final concentration of 50 ppm, 100 ppm or 500 ppm in 50 ml of 50 percent aqueous acetone. Acetone is added to solubilize the compound and solutions made to final volume with deionized water.

Two containers, one each from Series 1 and 2 (see above), are sprayed simultaneously on a turntable with 50 ml of the test solution. Spray is provided by two fixed Spraying System Company nozzles mounted to deliver vertical and horizontal solid cone spray patterns. Immediately thereafter, all plants are returned to the greenhouse to permit the deposit to dry.

Plants of Series 1 and 2 are separately inoculated. Plants in Series 1 are inoculated with conidial suspensions of the respective pathogens using a DeVilbis paint sprayer operated at 4–6 psig and immediately transferred to a controlled temperature/humidity cabinet (ambient temperature, RH~95 percent). Plants in Series 2 are dusted with respective powdery mildew conidia and then removed to the controlled temperature room to await disease development. Plants in Series 1 are held 4 days in the cabinet, then transferred to the greenhouse to await disease expression.

PERFORMANCE RATING

All plants are rated for disease severity on a scale of 1 to 7 (clean to kill), as described below:

| Rating | Description |
|---|---|
| 1 | Nil |
| 2 | Trace disease |
| 3 | Slight disease |
| 4 | Moderate disease |
| 5 | Heavy disease |
| 6 | Severe disease |
| 7 | Kill |

In the accompanying tables of results, the numerical rating is used for clarity.

Data obtained are reported in Tables I and II below. The ratings reported represent data obtained from one or more individual tests. Where more than one test has been conducted, the ratings are averaged and reported as a single value rating. For each table, there is also provided a rating value for the checks employed and a rating range for acceptable disease control. It is, of course, obvious that the lower the value, the more effective the disease control. When a superscript is used in the table with a rating, it indicates some phytotoxicity. The legends, "S" means slight, "M" means moderate, and "SV" means severe phytotoxicity. Data are given for minimum effective levels at which compounds are evaluated.

TABLE I

Disease Severity of Plants Sprayed to Run-off with Indicated Rates (ppm) of Pyrazolium Compounds

| Test Compound | Rice Blast | | | Tomato Late Blight | | | Apple Scab | | |
|---|---|---|---|---|---|---|---|---|---|
| | 500 | 100 | 50 | 500 | 100 | 50 | 500 | 100 | 50 |
| Acceptable Disease Control Ratings | | 1 to 4 | | | 1 to 4 | | | 1 to 4 | |
| Check Ratings | 6 | 6 | 6 | 7 | 7 | 7 | 6 | 6 | 6 |
| 1,2-Dimethyl-3,5-diphenylpyrazolium p-toluene sulfonate | 3.0 | | | | | | 4.0 | | |
| 1,2-Dimethyl-3,5-diphenylpyrazolium iodide | | | | | | | 4.5 | 4.0 | |
| 1,2-Dimethyl-3,5-diphenylpyrazolium methyl sulfate | | 3.5 | 5.3 | iodide | | | 3.0 | 4.3 | 4.0 |
| 1,2-Dimethyl-3,5-diphenylpyrazolium bromide | | | | | | | 4.5 | | |
| 1,2-Dimethyl-3,5-diphenylpyrazolium chloride | | | | | | | 1.5 M | | |
| 1,2-Dimethyl-3,5-diphenylpyrazolium nitrate | | | | | | | 2.0 S | | |
| 1,2-Dimethyl-3,5-diphenylpyrazolium perchlorate | 3.0 | | | | | | 3.0 | 4.0 | |
| 1,2-Dimethyl-3,5-diphenylpyrazolium hydroxide | | | | | | | 3.5 M | | |
| 1,2-Dimethyl-3,5-diphenylpyrazolium phosphate (1:1) | | | | | | | 4.0 | | |
| 5-(p-Chlorophenyl)-1,2-dimethyl-3-phenyl-pyrazolium perchlorate | 4.0 | | | | 4.0 | | | | |
| 3,5-bis(p-Chlorophenyl)-1,2-dimethylpyrazolium perchlorate | 4.0 | | | | | | | | |
| 3,5-bis(p-Chlorophenyl)-1,2-dimethylpyrazolium sulfate (1:1) | 4.0 | | | | | | | | |
| 3,5-bis(p-Chlorophenyl)-1,2-dimethylpyrazolium methyl sulfate | 4.0 | | | | | | | 4.0 | |
| 1,2-Dimethyl-3,5-di-p-tolylpyrazolium perchlorate | 4.0 | 3.5 | | | | | | | |
| 1,2-Dimethyl-3,5-di-p-tolylpyrazolium methyl sulfate | | | | | | | | 4.0 | |
| 3,5-bis(p-Methoxyphenyl)-1,2-dimethylpyrazolium p-toluene sulfonate | | | | | | | | 4.0 | |
| 3,5-bis(p-Methoxyphenyl)-1,2-dimethylpyrazolium methyl sulfate | | | | | | | | 3.0 | |
| 1,2-Dimethyl-3-phenyl-5-p-tolylpyrazolium methyl sulfate | | | | | | | | 3.0 S | |
| 3-(p-Chlorophenyl)-5-(p-methoxyphenyl)-1,2-dimethylpyrazolium perchlorate | | | | | | | | 3.5 | |
| 3-(2,4-Dichlorophenyl)-1,2-dimethyl-5-phenyl-pyrazolium methyl sulfate | | | | | | | | 1.0 S | |
| 1,2-Dimethyl-3-m-tolyl-5-p-tolylpyrazolium perchlorate | | | | | | | | 4.0 | |
| 1,2-Dimethyl-5-o-tolyl-3-p-tolylpyrazolium iodide | 4.0 | | | | | | | | |

TABLE I-continued

Disease Severity of Plants Sprayed to Run-off with Indicated Rates (ppm) of Pyrazolium Compounds

| Test Compound | Rice Blast | | | Tomato Late Blight | | | Apple Scab | | |
|---|---|---|---|---|---|---|---|---|---|
| | 500 | 100 | 50 | 500 | 100 | 50 | 500 | 100 | 50 |
| Acceptable Disease Control Ratings | | 1 to 4 | | | 1 to 4 | | | 1 to 4 | |
| Check Ratings | 6 | 6 | 6 | 7 | 7 | 7 | 6 | 6 | 6 |
| 3-(p-Fluorophenyl)-1,2-dimethyl-5-phenylpyrazolium sulfate | S | | | | | | 4.0 | | |
| 3,5-bis(p-Fluorophenyl)-1,2-dimethylpyrazolium iodide | | | | | | | 4.0 | | |
| 3-(p-Butoxyphenyl)-1,2-dimethyl-5-phenylpyrazolium perchlorate | | | | | | | 2.3 S | | |
| 3-(p-Butoxyphenyl)-1,2-dimethyl-5-phenylpyrazolium iodide | | | | | | | 3.7 | | |
| 1,2-Dimethyl-3-phenyl-5-(3,4-xylyl)pyrazolium iodide | | | | | | | 3.0 | | |
| 1,2-Dimethyl-3-phenyl-5-(2,4-xylyl)pyrazolium perchlorate | 3.0 | | | | | | | | |
| 1,2-Dimethyl-3-phenyl-5-(3,4-xylyl)pyrazolium perchlorate | 4.0 | | | | | | | | |
| 1,2-Dimethyl-3-phenyl-5-(2,4-xylyl)pyrazolium iodide | | | | | | | 4.0 | | |
| 3-(p-Fluorophenyl)-1,2-dimethyl-5-phenyl-pyrazolium methyl sulfate | | | | | | | 4.0 | | |
| 3-(p-Fluorophenyl)-1,2-dimethyl-5-phenyl-pyrazolium perchlorate | | | | | | | 2.0 | | |
| 3,5-bis(m-Chlorophenyl)-1,2-dimethylpyrazolium methyl sulfate | | | | | | | 4.0 | | |
| 5-(m-Fluorophenyl)-1,2-dimethyl-3-phenylpyrazolium methyl sulfate | | | | | | | 4.0 S | | |
| 5-(2,5-Dichlorophenyl)-1,2-dimethyl-3-phenyl-pyrazolium methyl sulfate | | | | | | | 4.0 | | |
| 1,2-Dimethyl-3,5-di-o-tolylpyrazolium sulfate (1:1) | 3.5 M | 3.0 | 4.0 | | | | | | |
| 5-(3,5-Dimethoxyphenyl)-1,2-dimethyl-3-phenyl-pyrazolium perchlorate | 4.0 | | | | | | | | |
| 3-(o-Fluorophenyl)-1,2-dimethyl-5-m-tolyl-pyrazolium iodide | | | | | | | 4.0 | | |
| 3-(o-Fluorophenyl)-1,2-dimethyl-5-m-tolyl-pyrazolium methyl sulfate | | | | | | | 4.0 | | |
| 1,2-Dimethyl-3-phenyl-5-(2,3-xylyl)pyrazolium iodide | 4.0 | | | | | | | | |
| 1,2-Dimethyl-3-phenyl-5-(2,3-xylyl)pyrazolium perchlorate | 4.0 | | | | | | | | |
| 1,2-Dimethyl-3-phenyl-5-m-tolylpyrazolium iodide | | | | | | | 3.5 | 4.0 | |

TABLE II

Disease Severity of Plants Sprayed to Run-off with Indicated Rates (ppm) of Pyrazolium Compounds

| Test Compound | Cucumber Powdery | | | Wheat Powdery | | | Apple Powdery | | | Barley Powdery | | |
|---|---|---|---|---|---|---|---|---|---|---|---|---|
| | 500 | 100 | 50 | 500 | 100 | 50 | 500 | 100 | 50 | 500 | 100 | 50 |
| Acceptable Rating | | 1 to 4 | | | 1 to 3 | | | 1 to 3 | | | 1 to 4 | |
| Check Ratings | 6 | 6 | 6 | 6 | 6 | 6 | 6 | 6 | 6 | 6 | 6 | 6 |
| 1,2-Dimethyl-3,5-diphenylpyrazolium p-toluene sulfonate | 4.0 | | | 2.0 | 3.0 | | | | | | | |
| 1,2-Dimethyl-3,5-diphenylpyrazolium sulfate (1:1) | 2.5 | | | | | | 3.0 | | | | | |
| 1,2-Dimethyl-3,5-diphenylpyrazolium iodide | | | | 1.8 | 2.0 | | | | | | | |
| 1,2-Dimethyl-3,5-diphenylpyrazolium methyl sulfate | 3.0 | | | 1.5 | 2.4 | | | | | | 2.0 | 3.0 |
| 1,2-Dimethyl-3,5-diphenylpyrazolium bromide | 4.0 M | | | 1.5 S | | | | | | | | |
| 1,2-Dimethyl-3,5-diphenylpyrazolium chloride | 3.5 M | | | 1.0 S | | | 2.5 S | | | | | |
| 1,2-Dimethyl-3,5-diphenylpyrazolium nitrate | | | | 1.0 S | | | | | | | | |
| 1,2-Dimethyl-3,5-diphenylpyrazolium perchlorate | | | | 2.0 | | | 2.5 | | | | | |
| 1,2-Dimethyl-3,5-diphenylpyrazolium hydroxide | | | | 1.5 | | | | | | | | |
| 1,2-Dimethyl-3,5-diphenylpyrazolium phosphate (2:1) | | | | 1.5 | | | | | | | | |
| 1,2-Dimethyl-3,5-diphenylpyrazolium phosphate (1:1) | | | | 1.0 SV | | | | | | | | |
| 3,5-bis(p-Chlorophenyl)-1,2-dimethyl-pyrazolium perchlorate | | | | 3.0 | | | | | | | | |
| 1,2-Dimethyl-3,5-di-p-tolylpyrazolium perchlorate | | | | 2.0 | | | | | | | | |
| 1,2-Dimethyl-3,5-di-p-tolylpyrazolium | 2.8 | | | 1.4 | 2.7 | | | | | | 3.0 | |

TABLE II-continued

Disease Severity of Plants Sprayed to Run-off with Indicated Rates (ppm) of Pyrazolium Compounds

| Test Compound | Cucumber Powdery | | | Wheat Powdery | | | Apple Powdery | | | Barley Powdery | | |
|---|---|---|---|---|---|---|---|---|---|---|---|---|
| | 500 | 100 | 50 | 500 | 100 | 50 | 500 | 100 | 50 | 500 | 100 | 50 |
| Acceptable Rating | 1 to 4 | | | 1 to 3 | | | 1 to 3 | | | 1 to 4 | | |
| Check Ratings | 6 | 6 | 6 | 6 | 6 | 6 | 6 | 6 | 6 | 6 | 6 | 6 |
| methyl sulfate | | | | | | | | | | | | |
| 1,2-Dimethyl-3,5-di-p-tolylpyrazolium p-toluene sulfonate | 2.5 M | | | 1.0 | 2.8 | | | | | 2.5 | | |
| 3,5-bis(p-Methoxyphenyl)-1,2-dimethylpyrazolium p-toluene sulfate | | | | 1.0 | | | 3.0 | | | | | |
| 3,5-bis(p-Methoxyphenyl)-1,2-dimethylpyrazolium methyl sulfate | 4.0 | | | 2.5 | | | | | | | | |
| 3,5-bis(p-Methoxyphenyl)-1,2-dimethylpyrazolium perchlorate | 4.0 | | | 2.5 | | | | | | | | |
| 1,2-Dimethyl-3-phenyl-5-p-tolyl-pyrazolium methyl sulfate | 2.0 SV | | | 2.0 M | | | 2.5 S | | | | | |
| 3-(p-Chlorophenyl)-5-(p-methoxyphenyl)-1,2-dimethylpyrazolium perchlorate | 3.0 | | | 3.0 | | | | | | | | |
| 3-(2,4-Dichlorophenyl)-1,2-dimethyl-5-phenylpyrazolium methyl sulfate | | | | | | | 3.0 S | | | | | |
| 3-(2,4-Dichlorophenyl)-5-(3,5-dimethoxyphenyl)-1,2-dimethyl-pyrazolium methyl sulfate | 3.0 SV | | | | | | | | | | | |
| 1,2-Dimethyl-3-m-tolyl-5-p-tolyl-pyrazolium methyl sulfate | 1.0 SV | | | 1.0 | 2.0 | | 3.0 S | | | | | |
| 1,2-Dimethyl-3-m-tolyl-5-p-tolyl-pyrazolium perchlorate | 2.0 S | | | 3.0 S | | | | | | | | |
| 1,2-Dimethyl-5-o-tolyl-3-p-tolyl-pyrazolium perchlorate | 4.0 | | | 3.0 | | | | | | | | |
| 1,2-Dimethyl-5-o-tolyl-3-p-tolyl-pyrazolium iodide | 4.0 SV | | | 1.0 M | | | | | | | | |
| 3-(p-Fluorophenyl)-1,2-dimethyl-5-phenylpyrazolium sulfate (1:1) | | | | 2.0 | | | | | | | | |
| 3-(p-Fluorophenyl)-1,2-dimethyl-5-phenylpyrazolium iodide | 3.5 S | | | 2.3 | | | | | | 3.5 | | |
| 3,5-bis(p-Fluorophenyl)-1,2-dimethyl-pyrazolium iodide | | | | 3.0 | | | | | | 2.0 | 4.0 | |
| 3-(o-Fluorophenyl)-5-(p-fluorophenyl)-1,2-dimethylpyrazolium iodide | | | | 1.0 | | | | | | | | |
| 5-(p-tert-Butylphenyl)-1,2-dimethyl-3-phenylpyrazolium sulfate | 4.0 M | | | 2.0 SV | | | | | | | | |
| 3-(p-Butoxyphenyl)-1,2-dimethyl-5-phenylpyrazolium perchlorate | 3.7 SV | | | 1.7 SV | | | | | | 2.0 | | |
| 3-(p-Butoxyphenyl)-1,2-dimethyl-5-phenylpyrazolium iodide | 1.0 SV | 4.0 | | 1.3 | 2.0 | | | | | 1.5 | 3.0 | |
| 5-(3-Chloro-o-tolyl)-3-(p-ethyl-phenyl)-1,2-dimethylpyrazolium perchlorate | 4.0 | | | 2.5 | | | | | | | | |
| 3,5-bis(2,4-Dichlorophenyl)-1,2-dimethylpyrazolium perchlorate | | | | 3.0 | | | | | | | | |
| 5-(3-Chloro-o-tolyl)-3-(p-ethyl-phenyl)-1,2-dimethylpyrazolium iodide | | | | 2.0 | | | | | | 1.0 | 1.0 | 4.0 |
| 5-(3,4-Dimethoxyphenyl)-1,2-dimethyl-3-(3,4-xylyl)pyrazolium iodide | 1.0 | | | | | | | | | | | |
| 1,2-Dimethyl-3-phenyl-5-(3,4-xylyl)-pyrazolium methyl sulfate [and sulfate (1:1)] | 1.0 M | | | 1.5 M | 2.0 | | 3.0 M | | | 1.0 | | |
| 1,2-Dimethyl-3-phenyl-5-(3,4-xylyl)-pyrazolium iodide | 4.0 S | | | 2.0 | | | | | | | | |
| 1,2-Dimethyl-3-phenyl-5-(2,4-xylyl)-pyrazolium perchlorate | | | | 3.0 S | | | | | | | | |
| 1,2-Dimethyl-3-phenyl-5-(3,4-xylyl)-pyrazolium perchlorate | 4.0 S | | | 2.0 S | 1.0 | | | | | | | |
| 1,2-Dimethyl-3-phenyl-5-(2,4-xylyl)-pyrazolium iodide | | | | 2.5 | 1.0 | | | | | | | |
| 3-(4-Chloro)-o-tolyl-1,2-dimethyl-5-p-tolylpyrazolium perchlorate | | | | 2.5 | | | | | | | | |
| 3-(p-Fluorophenyl)-1,2-dimethyl-5-phenylpyrazolium methyl sulfate | | | | | | | 3.0 | | | | | |
| 3-(p-Fluorophenyl)-1,2-dimethyl-5-phenylpyrazolium perchlorate | | | | 3.0 | | | | | | | | |
| 3,5-bis(m-Chlorophenyl)-1,2-dimethylpyrazolium methyl sulfate | 3.5 S | | | 1.3 M | 3.0 | | 2.0 | | | | | |
| 5-(m-Fluorophenyl)-1,2-dimethyl-3-phenylpyrazolium methyl sulfate | 4.0 M | | | 2.0 S | 2.0 | | | | | | | |
| 5-(2,5-Dichlorophenyl)-1,2-dimethyl-3-phenylpyrazolium methyl sulfate | | | | 2.0 M | | | 3.0 | | | | | |
| 3-(o-Methoxyphenyl)-1,2-dimethyl-5-phenylpyrazolium methyl sulfate | | | | 2.0 | 3.0 | | | | | | | |
| 1,2-Dimethyl-5-phenyl-3-(3,5-xylyl)-pyrazolium methyl sulfate | | | | 1.0 SV | 2.0 | 3.0 | 3.0 S | | | | | |

TABLE II-continued

Disease Severity of Plants Sprayed to Run-off with Indicated Rates (ppm) of Pyrazolium Compounds

| Test Compound | Cucumber Powdery | | | Wheat Powdery | | | Apple Powdery | | | Barley Powdery | | |
|---|---|---|---|---|---|---|---|---|---|---|---|---|
| | 500 | 100 | 50 | 500 | 100 | 50 | 500 | 100 | 50 | 500 | 100 | 50 |
| Acceptable Rating | 1 to 4 | | | 1 to 3 | | | 1 to 3 | | | 1 to 4 | | |
| Check Ratings | 6 | 6 | 6 | 6 | 6 | 6 | 6 | 6 | 6 | 6 | 6 | 6 |
| 1,2-Dimethyl-3,5-di-o-tolylpyrazolium sulfate (1:1) | | | | 1.5 | | | | | | | | |
| 5-(3,5-Dimethoxyphenyl)-1,2-dimethyl-3-phenylpyrazolium methyl sulfate | | | | 2.0 | | | | | | | | |
| 3,5-bis(m-Fluorophenyl)-1,2-dimethyl-pyrazolium methyl sulfate | | | | 2.0 S | | | 3.0 S | | | | | |
| 3-(o-Fluorophenyl)-1,2-dimethyl-5-phenylpyrazolium methyl sulfate | 3.5 M | | | 1.3 M | 3.0 | | | | | | | |
| 1,2-Dimethyl-3-m-tolyl-5-o-tolyl-pyrazolium perchlorate | 3.5 | | | 1.0 M | 1.5 | | | | | | | |
| 1,2-Dimethyl-3-m-tolyl-5-o-tolyl-pyrazolium iodide | | | | 1.0 | 2.0 | 2.0 | | | | | | |
| 5-(m-Iodophenyl)-1,2-dimethyl-3-phenylpyrazolium perchlorate | 3.0 SV | | | 2.0 S | | | | | | | | |
| 5-(m-Iodophenyl)-1,2-dimethyl-3-phenylpyrazolium iodide | 4.0 SV | | | 2.0 S | | | | | | 1.0 | 3.0 | 4.0 |
| 3-(o-Fluorophenyl)-1,2-dimethyl-5-m-tolylpyrazolium methyl sulfate | | | | 1.0 | | | | | | 1.0 | | |
| 3-(o-Fluorophenyl)-1,2-dimethyl-5-m-tolylpyrazolium iodide | | | | 1.0 SV | | | 1.0 | | | 3.0 | | |
| 1,2-Dimethyl-3-phenyl-5-(2,5-xylyl)-pyrazolium perchlorate | 4.0 M | | | 1.5 M | 2.0 | 3.0 | | | | | | |
| 1,2-Dimethyl-3-phenyl-5-(2,3-xylyl)-pyrazolium iodide | 3.0 M | | | 1.0 S | 2.0 | | | | | | | |
| 1,2-Dimethyl-3-phenyl-5-(2,3-xylyl)-pyrazolium perchlorate | | | | 1.0 M | 2.0 | | | | | | | |
| 1,2-Dimethyl-3-phenyl-5-m-tolyl-pyrazolium iodide | 1.5 SV | 3.0 | | 1.0 M | 1.5 | | | | | | | |
| 1-Ethyl-2-methyl-3,5-diphenyl-pyrazolium ethyl sulfate | 2.0 | | | 1.5 | | | | | | | | |
| 1-Benzyl-2-methyl-3,5-diphenyl-pyrazolium perchlorate | | | | 2.0 | | | | | | | | |
| 1-Methyl-2,3,5-triphenylpyrazolium methyl sulfate | | | | 1.5 | | | | | | | | |
| 1-Allyl-2-methyl-3,5-diphenyl-pyrazolium methyl sulfate [and sulfate (1:1)] | | | | 1.0 | | | | | | | | |
| 1-(Carboxymethyl)-2-methyl-3,5-diphenylpyrazolium methyl sulfate [and sulfate (1:1) ethyl ester] | | | | 2.5 | | | | | | | | |
| 1-Methyl-3,5-diphenyl-2-(2-propynyl)-pyrazolium methyl sulfate [and sulfate (1:1)] | | | | 3.0 | | | | | | | | |

Sulfate (1:1) = hydrogen sulfate

EXAMPLE 2

The pyrazolium salts of this invention are conveniently prepared by first condensing the appropriate diketone with hydrazine or a $C_1$-$C_4$ lower alkyl hydrazine to form the corresponding 3,5-diphenylpyrazole. Thereafter, said pyrazole is alkylated to form the desired pyrazolium salt.

Where hydrazine is employed in the condensation, alkylations are effected at the 1 and 2 positions. Where a lower alkyl hydrazine is employed in the initial condensation, alkylation is effected at the 2 position. These reactions are graphically depicted as follows:

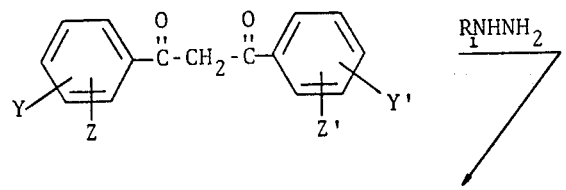

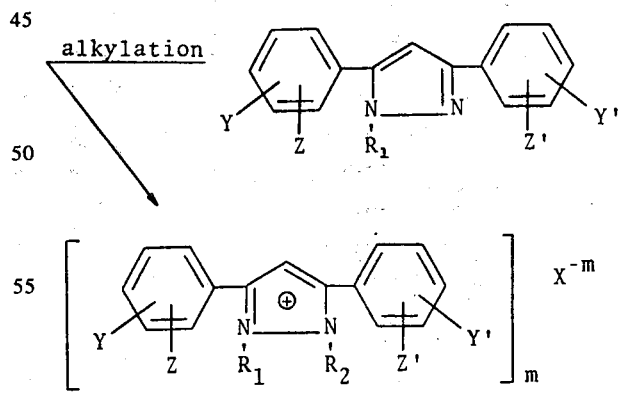

where $R_1$, $R_2$, $R_3$, $R_4$, X, m, Y, Z, Y' and Z' are each as above defined.

The ring-forming reaction between hydrazine or alkyl hydrazine and the diketone is preferably carried out in the presence of an aprotic solvent such as xylene, toluene or benzene, or in a protic solvent such as a $C_1$-$C_4$ alcohol at a temperature between 80°C. and 100°C.

Alkylation of the thus-formed 3,5-diphenylpyrazole is then carried out with an alkylating agent, such as an alkyl halide, alkyl sulfate, or alkyl toluene sulfonate, preferably in the presence of an acid acceptor, such as an alkali metal hydroxide, tertiary organic amine or alkali metal alkoxide.

Each of the reactions is illustrated below, along with a listing of final products.

Preparation of 1-Methyl-3,5-diphenylpyrazole

Five hundred forty-five grams (2.43 moles) of dibenzoylmethane and 533 ml of pyridine are stirred together and heated to 80°C. One hundred twelve grams (2.43 moles) of methylhydrazine are then slowly added to the mixture and a strong exothermic reaction ensues necessitating cooling of the mixture with a water bath. When addition is complete, the mixture is heated to reflux and maintained in this condition for 40 minutes. The mixture is then cooled to 30°C, poured into 19 liters of 3N HCl, filtered, and the solid collected. This is reslurried in 198 grams (2.43 moles) of sodium acetate dissolved in 19 liters of water. The mixture is filtered, water washed and air dried to give 535 grams of product, 94.5 percent yield, having melting point 58°C to 59°C.

Preparation of 1,2-Dimethyl-3,5-diphenylpyrazolium p-toluene sulfonate

Four hundred grams (1.71 moles) of 1-methyl-3,5-diphenylpyrazole is dissolved in 2,100 ml of xylene and the solution thus prepared dried by azeotropic distillation. The solution is cooled to 70°C and 318 grams (1.71 moles) of methyl-p-toluene sulfonate is added. The mixture is then refluxed for one hour and cooled causing the product to crystallize. When the mixture is cooled to 40°C, 1000 ml of acetone are added. The mixture is filtered, washed with acetone, and dried in vacuo yielding 495 grams (69 percent) of product having a melting point of 177°C to 178°C.

Preparation of 1,2-Dimethyl-3,5-diphenylpyrazolium iodide

Five grams of 1-methyl-3,5-diphenylpyrazole is dissolved in 30 ml of dry benzene with heating and constant stirring. Thirty and four-tenths grams of methyl iodide is added to the mixture, and the mixture heated to reflux. After refluxing for 12 hours, the mixture is cooled and filtered. The filtrate is again refluxed and as product forms, it is separated from the mixture by filtration. The total amount of solid recovered is 1.21 grams, 15 percent yield, having a melting point of 167°C to 169°C.

Other 1,2-disubstituted-3,5-diphenylpyrazolium salts prepared by the above procedures are as follows:

1,2-Dimethyl-3,5-diphenylpyrazolium p-toluene sulfonate (melting point 180°–182°C);
1,2-Dimethyl-3,5-diphenylpyrazolium iodide (melting point 168°–169°C);
1,2-Dimethyl-3,5-diphenylpyrazolium methyl sulfate (melting point 146°–148°C);
1,2-Dimethyl-3,5-diphenylpyrazolium bromide (melting point 188°–189°C);
1,2-Dimethyl-3,5-diphenylpyrazolium chloride (melting point 179.5°–181°C);
1,2-Dimethyl-3,5-diphenylpyrazolium nitrate (melting point 140°–141.5°C);
1,2-Dimethyl-3,5-diphenylpyrazolium perchlorate (melting point 183°–184°C);
1,2-Dimethyl-3,5-diphenylpyrazolium hydroxide (melting point 100.5°–103°C);
1,2-Dimethyl-3,5-diphenylpyrazolium phosphate (1:1) (melting point 191.5°–195°C);
5-(p-Chlorophenyl)-1,2-dimethyl-3-phenylpyrazolium perchlorate (melting point 136.5°–138°C);
3,5-bis(p-Chlorophenyl)-1,2-dimethylpyrazolium perchlorate (melting point 192.5°–194°C);
3,5-bis(p-Chlorophenyl)-1,2-dimethylpyrazolium sulfate (melting point 263°–264°C);
3,5-bis(p-Chlorophenyl)-1,2-dimethylpyrazolium methyl sulfate (melting point 180°–182°C);
1,2-Dimethyl-3,5-di-p-tolylpyrazolium perchlorate (melting point 132°–134°C);
1,2-Dimethyl-3,5-di-p-tolylpyrazolium methyl sulfate (melting point 174°–176°C);
3,5-bis(p-Methoxyphenyl)-1,2-dimethylpyrazolium p-toluene sulfonate (melting point 127.5°–129°C);
3,5-bis(p-Methoxyphenyl)-1,2-dimethylpyrazolium methyl sulfate (melting point 137°–138.5°C);
1,2-Dimethyl-3-phenyl-5-p-tolylpyrazolium methyl sulfate (melting point 107°–110°C);
3-(p-Chlorophenyl)-5-(p-methoxyphenyl)-1,2-dimethylpyrazolium perchlorate (melting point 170°–172°C);
3-(2,4-Dichlorophenyl)-1,2-dimethyl-5-phenylpyrazolium methyl sulfate (melting point 171°–176°C);
1,2-Dimethyl-3-m-tolyl-5-p-tolylpyrazolium perchlorate (melting point 92°–94°C);
1,2-Dimethyl-5-o-tolyl-3-p-tolylpyrazolium iodide (melting point 173°–174°C);
3-(p-Fluorophenyl)-1,2-dimethyl-5-phenylpyrazolium sulfate (1:1) (melting point 118°–119°C);
3,5-bis(p-Fluorophenyl)-1,2-dimethylpyrazolium iodide (melting point 174°–176°C);
3-(p-Butoxyphenyl)-1,2-dimethyl-5-phenylpyrazolium perchlorate (melting point 80°–83°C);
3-(p-Butoxyphenyl)-1,2-dimethyl-5-phenylpyrazolium iodide (melting point 101°–103°C);
1,2-Dimethyl-3-phenyl-5-(3,4-xylyl)pyrazolium iodide (melting point 150°–151°C);
1,2-Dimethyl-3-phenyl-5-(2,4-xylyl)pyrazolium perchlorate (melting point 84°–88°C);
1,2-Dimethyl-3-phenyl-5-(3,4-xylyl)pyrazolium perchlorate (melting point 116°–118°C);
1,2-Dimethyl-3-phenyl-5-(2,4-xylyl)pyrazolium iodide (melting point 82°–82.5°C);
3-(p-Fluorophenyl)-1,2-dimethyl-5-phenylpyrazolium methyl sulfate (melting point 97.5°–99°C);
3-(p-Fluorophenyl)-1,2-dimethyl-5-phenylpyrazolium perchlorate (melting point 140°–144°C);
3,5-bis(m-Chlorophenyl)-1,2-dimethylpyrazolium methyl sulfate (boiling point 124°–129°C);
5-(m-Fluorophenyl)-1,2-dimethyl-3-phenylpyrazolium methyl sulfate (melting point 120°–121°C);
5-(2,5-Dichlorophenyl)-1,2-dimethyl-3-phenylpyrazolium methyl sulfate (melting point 157°–158°C);
1,2-Dimethyl-3,5-di-o-tolylpyrazolium sulfate (1:1) (melting point 157°–158°C);
5-(3,5-Dimethoxyphenyl)-1,2-dimethyl-3-phenylpyrazolium perchlorate (melting point 168°–170°C);
3-(o-Fluorophenyl)-1,2-dimethyl-5-m-tolylpyrazolium iodide (melting point 172°–173°C);

3-(o-Fluorophenyl)-1,2-dimethyl-5-m-tolyl-pyrazolium methyl sulfate (melting point 133°–134°C);

1,2-Dimethyl-3-phenyl-5-(2,3-xylyl)pyrazolium iodide (melting point 169°–170°C);

1,2-Dimethyl-3-phenyl-5-(2,3-xylyl)pyrazolium perchlorate (melting point 144°–146°C);

1,2-Dimethyl-3-phenyl-5-m-tolylpyrazolium iodide (melting point 120°C);

1,2-Dimethyl-3,5-diphenylpyrazolium sulfate (1:1) (melting point 188°–189.5°C);

1,2-Dimethyl-3,5-diphenylpyrazolium phosphate (2:1) (melting point 113°–116°C);

1,2-Dimethyl-3,5-di-p-tolylpyrazolium p-toluene sulfonate (melting point 150°–151.5°C);

3,5-bis(p-Methoxyphenyl)-1,2-dimethylpyrazolium perchlorate (melting point 159.5°–161°C);

3-(2,4-Dichlorophenyl)-5-(3,5-dimethoxyphenyl)-1,2-dimethylpyrazolium methyl sulfate (melting point 162°–164°C);

1,2-Dimethyl-3-m-tolyl-5-p-tolylpyrazolium methyl sulfate (melting point 105°–108°C);

1,2-Dimethyl-5-o-tolyl-3-p-tolylpyrazolium perchlorate (melting point 150°–152°C);

3-(p-Fluorophenyl)-1,2-dimethyl-5-phenyl-pyrazolium iodide (melting point 192°–194°C);

3-(o-Fluorophenyl)-5-(p-fluorophenyl)-1,2-dimethylpyrazolium iodide (melting point 193°–194°C);

5-(p-tert-Butylphenyl)-1,2-dimethyl-3-phenyl-pyrazolium sulfate (1:1) (melting point 138°–141°C);

5-(3-Chloro-o-tolyl)-3-(p-ethylphenyl)-1,2-dimethylpyrazolium perchlorate (melting point 128°–134°C);

3,5-bis(2,4-Dichlorophenyl)-1,2-dimethyl-pyrazolium perchlorate (melting point 193°–195°C);

5-(3-Chloro-o-tolyl)-3-(p-ethylphenyl)-1,2-dimethylpyrazolium iodide (melting point 166°–168°C);

5-(3,4-Dimethoxyphenyl)-1,2-dimethyl-3-(3,4-xylyl)-pyrazolium iodide (melting point 182°C);

1,2-Dimethyl-3-phenyl-5-(3,4-xylyl)pyrazolium methyl sulfate [and sulfate (1:1)] (melting point 108°–110°C);

3-(4-Chloro-o-tolyl)-1,2-dimethyl-5-p-tolyl-pyrazolium perchlorate (melting point 200.5°–202°C);

3,5-bis(o-Chlorophenyl)-1,2-dimethylpyrazolium methyl sulfate (boiling point 139°–143°C);

3-(o-Methoxyphenyl)-1,2-dimethyl-5-phenyl-pyrazolium methyl sulfate (boiling point 113°–118°C);

1,2-Dimethyl-5-phenyl-3-(3,5-xylyl)pyrazolium methyl sulfate (melting point 123°–126°C);

5-(3,5-Dimethoxyphenyl)-1,2-dimethyl-3-phenyl-pyrazolium methyl sulfate (melting point 149°–158°C);

3,5-bis(m-Fluorophenyl)-1,2-dimethylpyrazolium methyl sulfate (melting point 134°–136°C);

3-(o-Fluorophenyl)-1,2-dimethyl-5-phenyl-pyrazolium methyl sulfate (melting point 119.5°–121°C);

1,2-Dimethyl-3-m-tolyl-5-o-tolylpyrazolium perchlorate (melting point 136°–140°C);

1,2-Dimethyl-5-o-tolyl-3-p-tolylpyrazolium iodide (melting point 160°–161°C);

5-(m-iodophenyl)-1,2-dimethyl-3-phenylpyrazolium perchlorate (melting point 83°–88°C);

5-(m-Iodophenyl)-1,2-dimethyl-3-phenylpyrazolium iodide (melting point 67°–77°C);

1,2-Dimethyl-3-phenyl-5-(2,5-xylyl)pyrazolium perchlorate (melting point 163.5°–164°C);

1,2-Dimethyl-3-phenyl-5-m-tolylpyrazolium iodide (melting point 120°C);

1-Ethyl-2-methyl-3,5-diphenylpyrazolium ethyl sulfate (melting point 109°–111°C);

1-Methyl-2,3,5-triphenylpyrazolium methyl sulfate (melting point 154°–155°C);

1-Benzyl-2-methyl-3,5-diphenylpyrazolium perchlorate (viscous oil);

1-Allyl-2-methyl-3,5-diphenylpyrazolium methyl sulfate [and sulfate (1:1)] (viscous oil);

1-(Carboxymethyl)-2-methyl-3,5-diphenyl-pyrazolium methyl sulfate [and sulfate (1:1) ethyl ester] (viscous brown oil); and 1-Methyl-3,5-diphenyl-2-(2-propynyl)pyrazolium methyl sulfate [and sulfate (1:1)] (viscous brown oil).

We claim:

1. A method for the control of fungi on plant crops comprising contacting said fungi with a fungicidally effective amount of a compound having the structure:

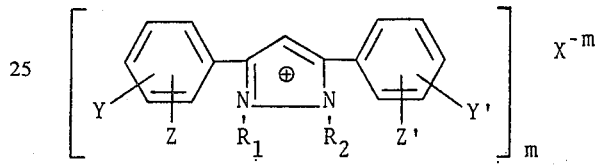

wherein $R_1$ is methyl; $R_2$ is $C_1$-$C_3$ alkyl, allyl, propynyl, ethylcarboxymethyl, phenyl or benzyl; Y, Y', Z and Z' each represent a member selected from the group consisting of hydrogen, halogen, $C_1$-$C_4$ alkyl and $C_1$-$C_4$ alkoxy; X represents an anion having a charge of 1 or 2; and m is 1 or 2.

2. The method according to claim 1, wherein $R_1$ is methyl; $R_2$ is $C_1$-$C_3$ alkyl, allyl, propynyl, ethylcarboxymethyl, phenyl or benzyl; Y, Y', Z and Z' are hydrogen; m is 1 or 2; and X is an anion with a charge of 1 or 2.

3. The method according to claim 1, wherein $R_1$ and $R_2$ are methyl; two members of Y, Y', Z and Z' are hydrogen and two are selected from the group consisting of chloro, fluoro, iodo, methyl, methoxy and butoxy; m is 1 or 2; and X is an anion with a charge of 1 or 2.

4. The method according to claim 1, wherein $R_1$ and $R_2$ are methyl; Y, Y', Z and Z' are hydrogen; m is 1; and X is an anion having a single negative charge.

5. A method for protecting living plants selected from the group consisting of cereal grains, ornamentals, shrubs, fruit trees, nut trees and fruit bearing vines from attack by fungi comprising, applying to the foliage of said plant crops a fungicidally effective amount of a compound having the structure:

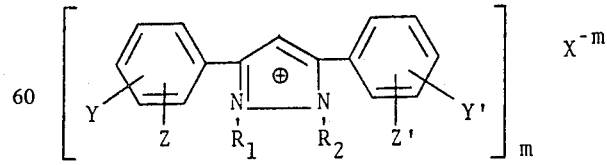

wherein $R_1$ is methyl; $R_2$ is $C_1$-$C_3$ alkyl, allyl, propynyl, ethylcarboxymethyl, phenyl or benzyl; Y, Y', Z and Z' each represent a member selected from the group consisting of hydrogen, halogen, $C_1$-$C_4$ alkyl and $C_1$-$C_4$ alkoxy; X represents an anion having a charge of 1 or 2;

and m is 1 or 2.

6. The method according to claim 5, wherein $R_1$ and $R_2$ are methyl; Y, Y', Z and Z' each represent a member selected from the group consisting of hydrogen, chloro, fluoro, iodo, methyl, methoxy and butoxy; m is 1; and X is an anion selected from the group consisting of chloride, bromide, iodide, methyl sulfate, perchlorate, p-toluene sulfonate, hydroxide, phosphate, benzene sulfonate, hydrogen sulfate and nitrate.

7. The method according to claim 5, wherein $R_1$ and $R_2$ are methyl; two members of Y, Y', Z and Z' are hydrogen and two are selected from the group consisting of chloro, fluoro, iodo, methyl, methoxy and butoxy; m is 1; and X is an anion selected from a group consisting of chloride, bromide, iodide, methyl sulfate, perchlorate, p-toluene sulfonate, hydroxide, phosphate, benzene sulfonate, hydrogen sulfate and nitrate.

8. The method according to claim 5, wherein the compound is 1,2-dimethyl-3,5-diphenylpyrazolium methyl sulfate.

9. The method according to claim 5, wherein the pyrazolium salt is applied in the form of an aqueous spray.

10. The method according to claim 5, wherein the compound is applied in the form of a liquid spray containing 50 ppm to 5,600 ppm of said compound.

11. The method according to claim 5, wherein the living plant is a cereal grain; the compound, wherein $R_1$ and $R_2$ are methyl; Y, Y', Z and Z' each represent a member selected from the group consisting of hydrogen, chloro, fluoro, iodo, methyl, methoxy and butoxy; m is 1; and X is an anion selected from the group consisting of chloride, bromide, iodide, methyl sulfate, perchlorate, p-toluene sulfonate, hydroxide, phosphate, benzene sulfonate, hydrogen sulfate, sulfate and nitrate; and wherein said compound is applied in the form of an aqueous spray to the foliage of the plants, said spray having a concentration of from 50 ppm to 500 ppm of the pyrazolium cation.

12. The method according to claim 5, wherein the fungi are selected from the group consisting of Phytophthora, Piricularia, Venturia, Erysiphe and Podosphaera, and the pyrazolium salt is applied in the form of an aqueous spray containing from 50 ppm to 500 ppm of the pyrazolium cation and from 0.1 percent to 5 percent by volume of a nonionic surfactant.

13. The method according to claim 5, wherein $R_1$ is methyl; $R_2$ is $C_1$-$C_3$ alkyl, allyl, propynyl, ethylcarboxymethyl, phenyl or benzyl; Y, Y', Z and Z' are hydrogen; m is 1 or 2; and X is an anion with a charge of 1 or 2.

14. The method according to claim 12, wherein the fungus is Erysiphe, and the plant to be protected is selected from the group consisting of wheat and barley.

* * * * *